(12) United States Patent
Wang et al.

(10) Patent No.: US 7,251,098 B1
(45) Date of Patent: Jul. 31, 2007

(54) DISK DRIVE ADJUSTING WRITE CLOCK FREQUENCY TO COMPENSATE FOR ECCENTRICITY IN DISK ROTATION

(75) Inventors: Zhi Wang, San Jose, CA (US); Jenghung Chen, Cupertino, CA (US); David Dung Tien Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/992,930

(22) Filed: Nov. 19, 2004

(51) Int. Cl.
*G11B 5/596* (2006.01)
*G11B 5/09* (2006.01)
(52) U.S. Cl. ............... 360/77.04; 360/51
(58) Field of Classification Search ........... None
See application file for complete search history.

(56) References Cited

U.S. PATENT DOCUMENTS

| | | | |
|---|---|---|---|
| 5,297,131 A * | 3/1994 | Tanaka .................. 369/275.2 |
| 5,761,165 A * | 6/1998 | Takeda et al. .................. 360/51 |
| 5,905,705 A | 5/1999 | Takeda et al. |
| 6,067,202 A | 5/2000 | Rowan et al. |
| 6,141,175 A * | 10/2000 | Nazarian et al. .......... 360/77.04 |
| 6,285,521 B1 | 9/2001 | Hussein |
| 6,285,622 B1 | 9/2001 | Haraguchi et al. |
| 6,377,418 B1 | 4/2002 | Kagami et al. |
| 6,381,292 B1 | 4/2002 | Yamakoshi |
| 6,496,324 B1 | 12/2002 | Golowka et al. |
| 6,498,698 B1 | 12/2002 | Golowka et al. |
| 6,567,230 B1 | 5/2003 | Kagami et al. |
| 6,577,088 B2 | 6/2003 | Heydt et al. |
| 6,621,652 B2 | 9/2003 | Haines et al. |
| 6,710,957 B2 | 3/2004 | Nakasato |
| 6,738,205 B1 | 5/2004 | Moran et al. |
| 6,754,025 B1 | 6/2004 | Shepherd et al. |
| 6,825,622 B1 | 11/2004 | Ryan et al. |
| 6,882,487 B2 | 4/2005 | Hanson et al. |
| 6,882,609 B2 * | 4/2005 | Williams et al. ......... 369/47.48 |
| 6,954,324 B1 | 10/2005 | Tu et al. |
| 6,972,540 B1 | 12/2005 | Wang et al. |
| 7,068,451 B1 * | 6/2006 | Wang et al. .................. 360/51 |
| 2001/0013989 A1 | 8/2001 | Saiki et al. |
| 2002/0036859 A1 | 3/2002 | Liu et al. |
| 2002/0078413 A1 | 6/2002 | Haines et al. |
| 2002/0084760 A1 | 7/2002 | Messenger et al. |
| 2003/0048083 A1 | 3/2003 | Tieu |
| 2003/0085682 A1 | 5/2003 | Hussein |

(Continued)

OTHER PUBLICATIONS

A. Sacks, M. Bodson, W. Messner, "Advanced Methods for Repeatable Runout Compensation", IEEE Transactions on Magnetics, vol. 31, No. 2, Mar. 1995.

*Primary Examiner*—K. Wong
(74) *Attorney, Agent, or Firm*—Howard H. Sheerin, Esq.

(57) ABSTRACT

A disk drive is disclosed that estimates a sinusoidal error in a wedge time period due to eccentricity in the disk rotating to generate eccentricity compensation values. During a write operation a head is positioned over a target data sector within a target track, a write clock frequency is set using an eccentricity compensation value corresponding to the target data sector, and data is written to the target data sector using the write clock frequency. In this manner, the eccentricity compensation value adjusts the write clock frequency to better optimize the linear bit density from the inner to outer diameter tracks.

4 Claims, 4 Drawing Sheets

U.S. PATENT DOCUMENTS

| | | |
|---|---|---|
| 2003/0102834 A1 | 6/2003 | Hussein |
| 2003/0184906 A1 | 10/2003 | Hanson et al. |
| 2004/0036436 A1 | 2/2004 | Tieu |
| 2004/0125485 A1 | 7/2004 | Ehrlich |
| 2004/0245950 A1 | 12/2004 | Ang et al. |
| 2005/0063087 A1 | 3/2005 | Ehrlich |
| 2005/0063088 A1 | 3/2005 | Ehrlich |
| 2005/0105205 A1 | 5/2005 | Suzuki |

* cited by examiner

DISK DRIVE ADJUSTING WRITE CLOCK FREQUENCY TO COMPENSATE FOR ECCENTRICITY IN DISK ROTATION

BACKGROUND OF THE INVENTION

1. Field of the Invention

The present invention relates to disk drives. In particular, the present invention relates to a disk drive that adjusts the write clock frequency to compensate for eccentricity in disk rotation.

2. Description of the Prior Art

A disk drive typically comprises one or more disks rotated by a spindle motor while heads are actuated radially over the disk surfaces. Each disk surface comprises a number of radially spaced, concentric tracks, where each track is divided into a number of data sectors. A number of embedded servo sectors forming servo wedges are also written on each disk surface, which facilitate seeking the head and maintaining the head over the centerline of a target track during read and write operations.

The disks are rotated at a constant angular velocity (CAV) while varying the data rate from an inner diameter zone to an outer diameter zone to maximize the recording density by maximizing the usable disk space at the outer diameter tracks. That is, the write clock frequency is adjusted relative to the radial location of the head so as to maintain a substantially constant linear bit density from the inner to outer diameter tracks correlative with an increasing linear velocity from the inner to outer diameter tracks. Ideally, the linear bit density for each zone on the disk is selected very near the maximum, that is, at a density where interference between adjacent bit cells is tolerable. However, eccentricity in the disk rotating will induce a sinusoidal disturbance in the linear velocity of the tracks relative to the head leading to a sinusoidal disturbance in the linear bit density. Eccentricities may occur, for example, if a media writer is used to servo write the disk before installing the disk into the disk drive, if the disk "slips" after using the head internal to the disk drive to servo write the disk, or if the disk slips after writing user data to the data sectors. Thus, prior art disk drives decrease the linear bit density selected for each zone on the disk by some predetermined margin to account for the worst case disturbance in the linear velocity, which leads to an undesirable decrease in storage capacity.

There is, therefore, a need to increase the storage capacity of disk drives by better optimizing the linear bit density from the inner to outer diameter zones.

SUMMARY OF THE INVENTION

The present invention may be regarded as a disk drive comprising a disk having a plurality of tracks, wherein each track comprises a plurality of data sectors and a plurality of servo sectors forming N servo wedges, and a wedge time period (WTP) occurs between each servo wedge. A head is actuated over the disk, and a disk controller estimates a sinusoidal error in the WTP due to eccentricity in the disk rotating to generate eccentricity compensation values. During a write operation the head is positioned over a target data sector within a target track, a write clock frequency is set using an eccentricity compensation value corresponding to the target data sector, and data is written to the target data sector using the write clock frequency. In this manner, the eccentricity compensation value adjusts the write clock frequency to better optimize the linear bit density from the inner to outer diameter tracks.

In one embodiment, the sinusoidal error in the WTP is estimated by positioning the head over a selected one of the tracks, and calculating an estimated WTP according to:

$$EST\_WTP = RTP + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a}, \hat{b}\}$ are adjustable coefficients. A wedge time error $e(k)$ is estimated as the difference between the estimated WTP and the detected actual WTP, and the coefficients $\{\hat{a}, \hat{b}\}$ for generating the estimated WTP are adjusted according to $$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain. The above steps of calculating an estimated WTP, detecting an actual WTP, estimating a wedge time error $e(k)$, and adjusting the coefficients $\{\hat{a}, \hat{b}\}$ are repeated at least once, for example, until the wedge time error $e(k)$ falls below a predetermined threshold.

The present invention may also be regarded as a method of estimating a sinusoidal error in a wedge time period (WTP) in a disk drive due to eccentricity in a disk rotating. The disk drive comprises the disk having a plurality of tracks, wherein each track comprises a plurality of data sectors and a plurality of servo sectors forming N servo wedges, wherein the WTP occurs between each servo wedge. The disk drive further comprising a head actuated over the disk. A sinusoidal error in the WTP due to eccentricity in the disk rotating is estimated to generate eccentricity compensation values. During a write operation the head is positioned over a target data sector within a target track, a write clock frequency is set using an eccentricity compensation value corresponding to the target data sector, and data is written to the target data sector using the write clock frequency. In this manner, the eccentricity compensation value adjusts the write clock frequency to better optimize the linear bit density from the inner to outer diameter tracks.

DESCRIPTION OF THE PREFERRED EMBODIMENTS

Figure 1:
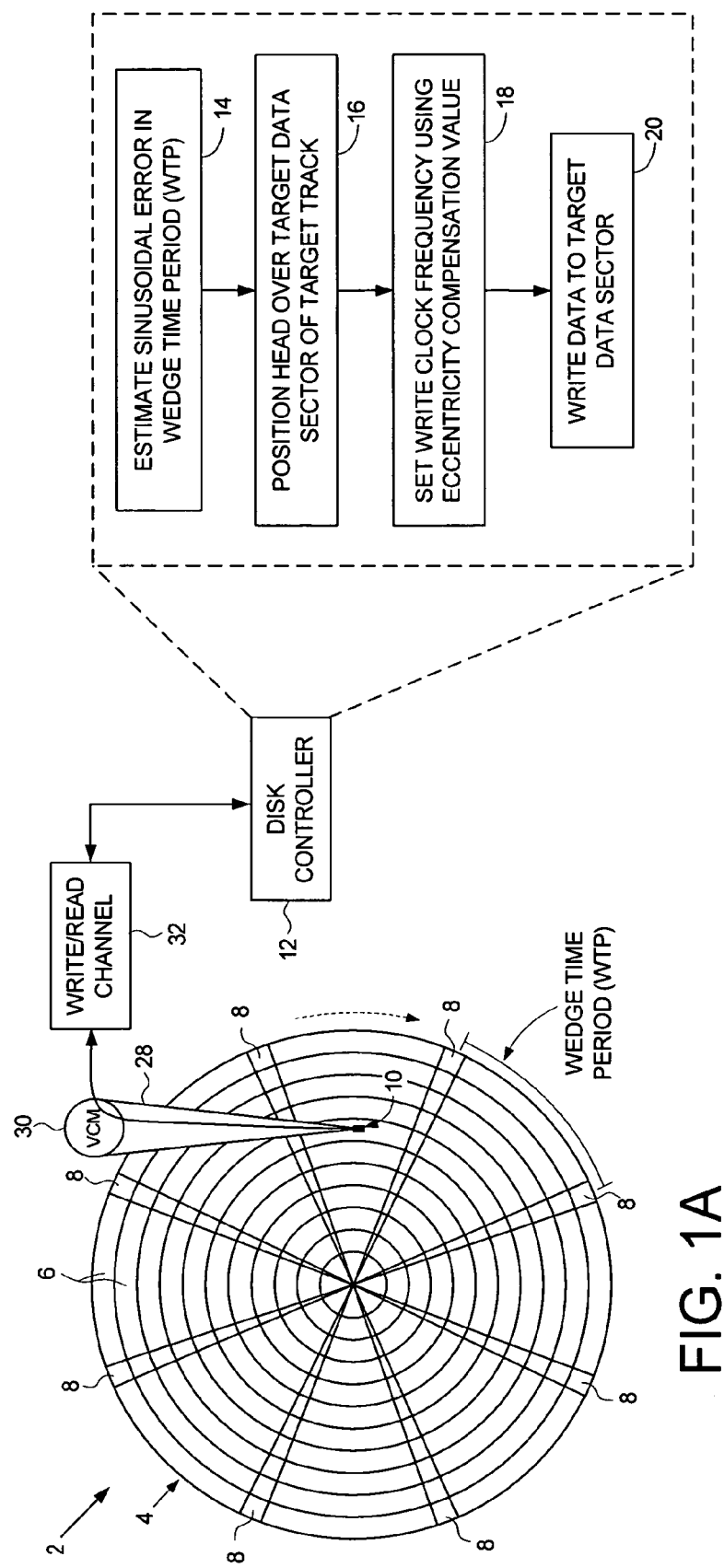
FIG. 1A shows a disk drive according to an embodiment of the present invention comprising a disk having a plurality of servo wedges, a head actuated over the disk, and a disk controller for estimating a sinusoidal error in a wedge time period (WTP).
FIG. 1B is a flow diagram according to an embodiment of the present invention wherein the estimated sinusoidal error in the WTP is used to generate eccentricity compensation values for adjusting the write clock frequency to better optimize the linear bit density.

FIG. 1A show a disk drive 2 according to an embodiment of the present invention comprising a disk 4 having a plurality of tracks 6, wherein each track comprises a plurality of data sectors and a plurality of servo sectors forming N servo wedges 8, and a wedge time period (WTP) occurs between each servo wedge 8. A head 10 is actuated over the disk 4, and a disk controller 12 executes the flow diagram of FIG. 2 to estimate a sinusoidal error in the WTP due to eccentricity in the disk 4 rotating to generate eccentricity compensation values at step 14. During a write operation at step 16 the head 10 is positioned over a target data sector within a target track, at step 18 a write clock frequency is set using an eccentricity compensation value corresponding to the target data sector, and at step 20 data is written to the target data sector using the write clock frequency. In this manner, the eccentricity compensation value adjusts the write clock frequency to better optimize the linear bit density from the inner to outer diameter tracks.

Figure 3A:
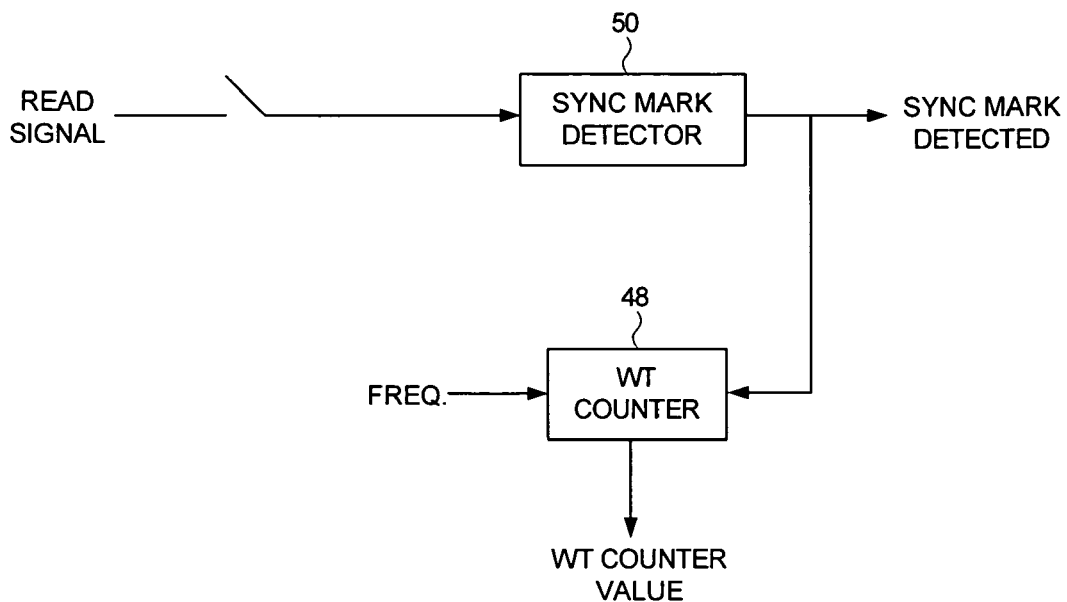
FIG. 3A shows an embodiment of the present invention wherein a wedge time counter is used to detect an actual WTP.

In the embodiment of FIGS. 1A and 1B, the head 10 is connected to a distal end of an actuator arm 28 which is rotated about a pivot by a voice coil motor (VCM) 30 in order to actuate the head 10 radially over the disk 4. A write/read channel 32 generates a write clock for writing data to the disk 4 during write operations, and a read clock for reading the data from the disk 4 during read operations. During read operations, the write/read channel 32 processes the read signal emanating from the head 10 and detects an estimated binary sequence representing the data recorded on the disk 4. The write/read channel 32 also detects the sync marks in the servo wedges 8 used to update a wedge time counter (FIG. 3A). The write/read channel 32 may be implemented as a separate integrated circuit, or integrated with the disk controller 12 in a "system on a chip".

The sinusoidal error in the WTP may be estimated using any suitable technique, such as the prior art technique of using a single-point Discrete Fourier Transform (DFT). In another embodiment, the sinusoidal error in the WTP is computed using closed-loop feedback by the disk controller 12 executing the flow diagram shown in FIG. 2. At step 34 the head 10 is positioned over a selected one of the tracks 6, and during each revolution of the disk 4 (step 36) an estimated WTP is calculated at step 38 according to:

$$EST\_WTP = RTP + \hat{a}^* \cos(2\pi k/N) + \hat{b}^* \sin(2\pi k/N)$$

wherein RTP is a reference time period corresponding to a nominal WTP, k is an index representing one of the servo wedges, and $\{\hat{a},\hat{b}\}$ are adjustable coefficients. At step 40 an actual WTP is detected by detecting an interval between the head 10 passing over a first and second servo wedge 8. At step 42 a wedge time error e(k) is estimated as the difference between the estimated WTP and the detected actual WTP. At step 44 the coefficients $\{\hat{a},\hat{b}\}$ for generating the estimated WTP are adjusted according to:

$$\hat{a}(k+1) = \hat{a}(k) - G^* e(k)^* \cos(2\pi k/N)$$

$$\hat{b}(k+1) = \hat{b}(k) - G^* e(k)^* \sin(2\pi k/N)$$

wherein G is a predetermined gain. At step 46 the above steps of calculating an estimated WTP, detecting an actual WTP, estimating a wedge time error e(k), and adjusting the coefficients $\{\hat{a},\hat{b}\}$ are repeated at least once, for example, until the wedge time error e(k) falls below a predetermined threshold.

Figure 2:
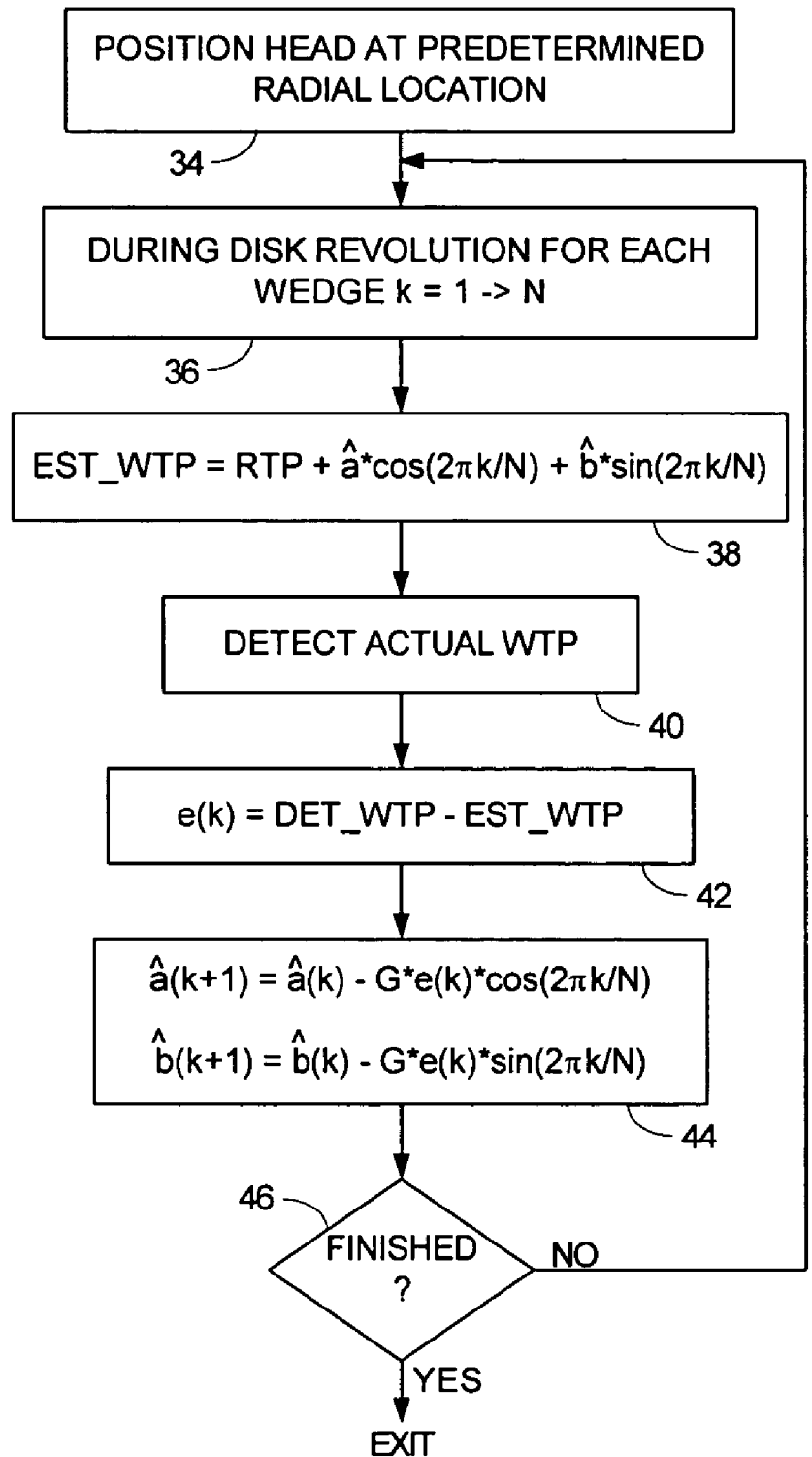
FIG. 2 is a flow diagram according to an embodiment of the present invention for estimating the sinusoidal error in the WTP by estimating coefficients of the sinusoid using closed-loop feedback.

Because the embodiment of FIG. 2 uses closed-loop feedback, the above equation will converge to an accurate estimate of the coefficients $\{\hat{a},\hat{b}\}$ within fewer revolutions of the disk as compared to the prior art technique of computing a single-point DFT. In one embodiment, the number of iterations to compute the coefficients using the above equation is determined based on a fixed number of disk revolutions. In an alternative embodiment, the iterations are terminated once the wedge time error e(k) falls below a predetermined threshold thereby minimizing the number of disk revolutions.

In one embodiment, the flow diagram of FIG. 2 is executed over a number of different radial locations (different tracks 6) to account for the change in the sinusoidal error relative to the radial location of the head 10. For example, in one embodiment the disk drive is partitioned into a number of zones wherein each zone comprises a predetermined band of tracks. The flow diagram is executed for a selected track in each zone (e.g., the middle track) and the resulting coefficients $\{\hat{a},\hat{b}\}$ used for each track in the zone. A suitable interpolation technique may also be employed to calculate the coefficients $\{\hat{a},\hat{b}\}$ based on the radial location (track number), for example, using a suitable curve fitting polynomial.

Any suitable circuitry may be employed to detect the actual WTP at step 40 of FIG. 2. FIG. 3A shows an embodiment of the present invention wherein a wedge time counter 48 is clocked at a predetermined frequency. When a sync mark detector 50 detects a sync mark in the servo wedge 8, the value of the wedge time counter 48 is latched as a servo time stamp. The actual WTP detected at step 40 of FIG. 2 is then computed as the difference between consecutive servo time stamps (wedge time counter values).

Figure 3B:
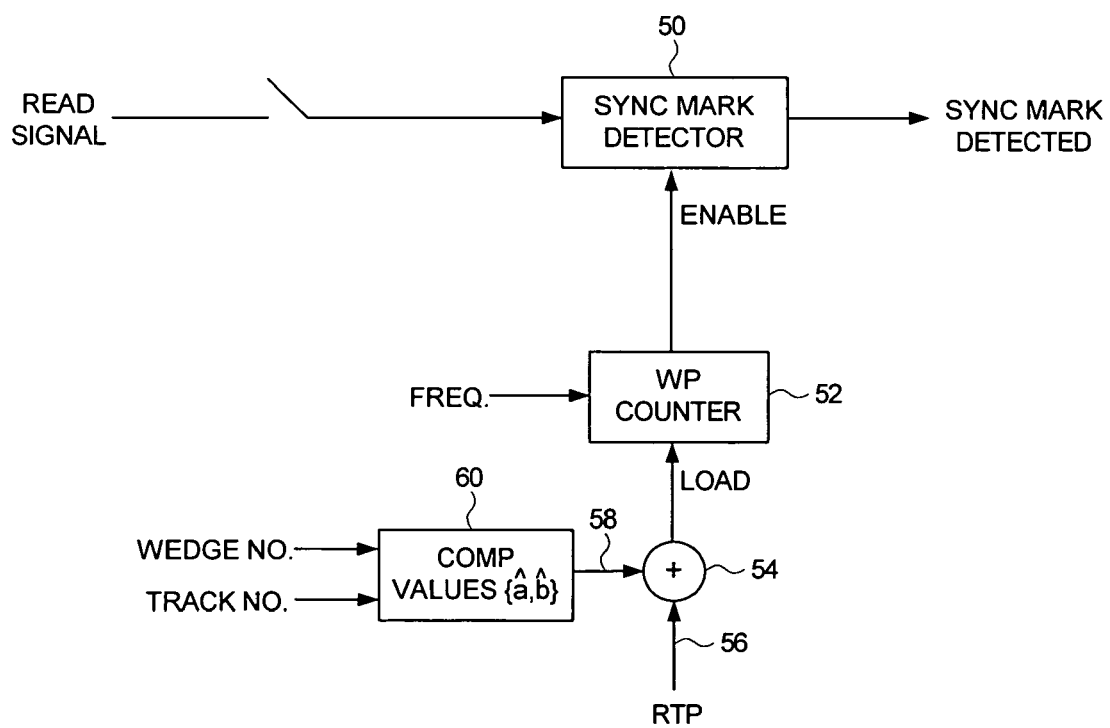
FIG. 3B shows an embodiment of the present invention wherein a wedge period counter is loaded with a nominal value adjusted by an eccentricity compensation value computed using the coefficients of the sinusoidal error in the WTP.

The coefficients $\{\hat{a},\hat{b}\}$ may be used in any suitable manner to enhance the operation of the disk drive 2. In an embodiment shown in FIG. 3B, the coefficients $\{\hat{a},\hat{b}\}$ are used to enable the sync mark detector 50 at the appropriate time by opening a sync mark detection window commensurate with the head 10 approaching a servo sync mark. A wedge period counter 52 is loaded with a count value corresponding to the estimated WTP for the current servo wedge. The count value is computed by adding 54 the RTP 56 to an eccentricity compensation value 58 computed 60 using the coefficients $\{\hat{a},\hat{b}\}$ as a function of the wedge number and track number. The eccentricity compensation values 58 may be computed 60 using any suitable technique such as a lookup table or curve fitting polynomial. The RTP 56 may also be generated using any suitable technique, such as computing the average WTP over a revolution of the disk during a calibration mode. After loading the wedge period counter 52 with the estimated WTP value, the wedge period counter 52 is decremented at a predetermined frequency and then opens the sync mark detection window when the wedge period counter 52 underflows.

Figure 4:
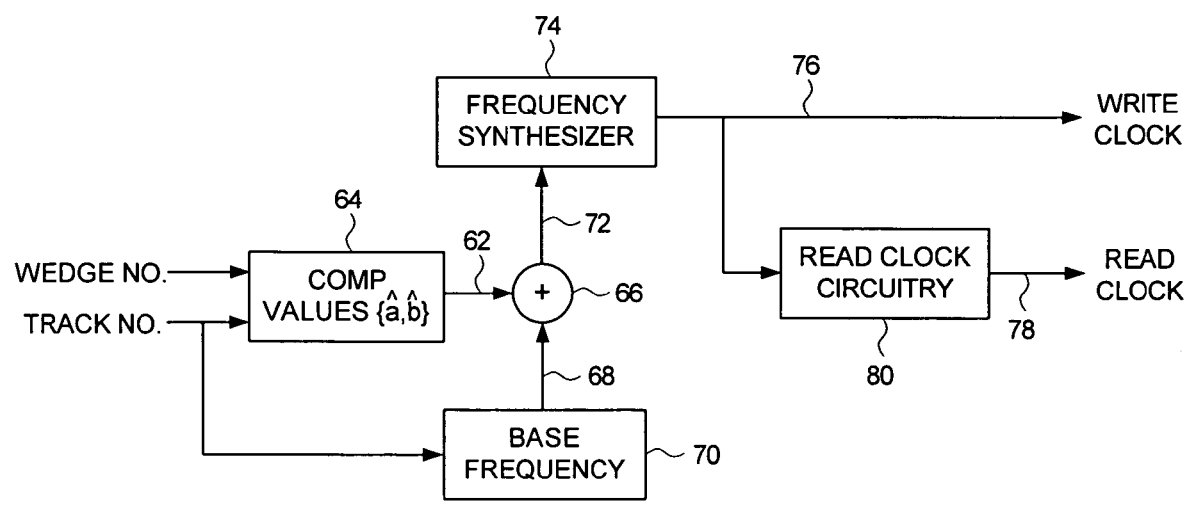
FIG. 4 shows an embodiment of the present invention wherein a frequency synthesizer is used to generate a write clock at a frequency that accounts for the eccentricity in the rotation of the disk to thereby maintain a substantially constant linear bit density.

FIG. 4 shows an embodiment of the present invention wherein coefficients $\{\hat{a},\hat{b}\}$ for estimating the sinusoidal error in the WTP are used to adjust the write frequency to achieve a substantially constant linear bit density. That is, the coefficients $\{\hat{a},\hat{b}\}$ are used to compensate for the sinusoidal speed variations due to the eccentricity in the disk rotating. An eccentricity compensation value 62 is computed 64 using coefficients $\{\hat{a},\hat{b}\}$ as a function of the current wedge number and track number. The eccentricity compensation value 62 is added 66 to a base frequency control signal 68 generated 70 as a function of the current track number (which corresponds to the current zone). The resulting compensated control signal 72 is applied to a frequency synthesizer 74, which generates a write clock 76 at a frequency that compensates for the sinusoidal speed variation as the disk rotates. During a read operation, a read clock 78 is generated by read clock circuitry 80 at a frequency that substantially matches the write clock 76 for the current wedge number and track number.

The write/read channel 32 of FIG. 1A may comprise any suitable modulation/demodulation circuitry for writing data to and reading data from the disk. In one embodiment, the write/read channel 32 comprises suitable partial-response/maximum-likelihood (PRML) circuitry, such as timing recovery circuitry, equalizing circuitry, and a Viterbi type sequence detector. During write operations, the write clock 76 clocks a preamp circuit to write data to the disk at a predetermined baud rate (write clock frequency). During a read operation, read signal samples values are generated synchronous to the baud rate and an estimated data sequence detected from the synchronous read signal sample values. The synchronous read signal sample values may be generated in any suitable manner, such as clocking a sampling device so as to sample the read signal synchronously (at a read clock frequency synchronized to the baud rate) or by sampling the read signal asynchronously and using an interpolation filter to generate synchronous read signal sample values. In addition, the eccentricity compensation values may be used to generate the synchronous sample values, for example, by generating an initial input frequency to a synchronous sampling phase locked loop (PLL), or by generating an asynchronous sampling clock for interpolated timing recovery. However, it may not be necessary to use the eccentricity compensation values to generate the synchronous sample values as long as the preamble is of sufficient length to lock the PLL when using synchronous sampling timing recovery, and as long as the interpolation filter has sufficient resolution and range when using interpolated timing recovery.

We claim:

1. A disk drive comprising:
   (a) a disk comprising a plurality of tracks, wherein:
       each track comprises a plurality of data sectors and a plurality of servo sectors forming N servo wedges; and
       a wedge time period (WTP) occurs between each servo wedge;
   (b) a head actuated over the disk; and
   (c) a disk controller for:
       estimating a sinusoidal error in the WTP due to eccentricity in the disk rotating to generate an eccentricity compensation value associated with a target track and a target servo wedge;
       positioning the head over a target data sector within the target track, the target data sector being in proximity to the target servo wedge;
       setting a write clock frequency for the target data sector in response to the eccentricity compensation value; and
   writing data to the target data sector using the write clock frequency;
       wherein the disk controller estimates the sinusoidal error in the WTP by:
       (A) positioning the head over a selected one of the tracks;
       (B) calculating an estimated WTP according to:

$$EST\_WTP = RTP + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a},\hat{b}\}$ are adjustable coefficients;
   (C) estimating a wedge time error e(k) as the difference between the estimated WTP and the detected actual WTP;
   (D) adjusting the coefficients $\{\hat{a},\hat{b}\}$ for generating the estimated WTP according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain; and
   (E) repeating steps (B)–(D) at least once.

2. The disk drive as recited in claim 1, wherein the disk controller repeats steps (B)–(D) until the wedge time error e(k) falls below a predetermined threshold.

3. A method of estimating a sinusoidal error in a wedge time period (WTP) in a disk drive due to eccentricity in a disk rotating, the disk drive comprising the disk having a plurality of tracks, wherein each track comprises a plurality of data sectors and a plurality of servo sectors forming N servo wedges, wherein the WTP occurs between each servo wedge, the disk drive further comprising a head actuated over the disk, the method comprising the steps of:
   (a) estimating a sinusoidal error in the WTP due to eccentricity in the disk rotating to generate an eccentricity compensation value associated with a target track and a target servo wedge;
   (b) positioning the head over a target data sector within the target track, the target data sector being in proximity to the target servo wedge;
   (c) setting a write clock frequency for the target data sector in response to the eccentricity compensation value; and
   (d) writing data to the target data sector using the write clock frequency;
   wherein the step of estimating the sinusoidal error in the WTP comprises the steps of:
   (A) positioning the head over a selected one of the tracks;
   (B) calculating an estimated WTP according to:

$$EST\_WTP = RTP + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a},\hat{b}\}$ are adjustable coefficients;
   (C) estimating a wedge time error e(k) as the difference between the estimated WTP and the detected actual WTP;
   (D) adjusting the coefficients $\{\hat{a},\hat{b}\}$ for generating the estimated WTP according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain; and
   (E) repeating steps (B)–(D) at least once.

4. The method as recited in claim 3, wherein steps (B)–(D) are repeated until the wedge time error e(k) falls below a predetermined threshold.

* * * * *